United States Patent [19]

Fornasiero et al.

[11] 3,749,840

[45] July 31, 1973

[54] TDM TELECOMMUNICATION SYSTEM DESIGNED FOR TRANSMISSION OF SUPERVISORY SIGNALS

[75] Inventors: Paolo Fornasiero; Sergio Tomasi, both of Milan, Italy

[73] Assignee: Societa Italiana Telecommunicazioni Siemens S.p.A., Milan, Italy

[22] Filed: Jan. 3, 1972

[21] Appl. No.: 215,130

[30] Foreign Application Priority Data

Dec. 31, 1970 Italy .............................. 33763 A/70

[52] U.S. Cl. .......................... 179/15 BY, 179/15 A

[51] Int. Cl. ............................................ H04j 3/12

[58] Field of Search ..................... 179/15 A, 15 AQ, 179/15 AT, 15 BY, 18 J

[56] References Cited

UNITED STATES PATENTS 3,560,662 2/1971 Casella ........................... 179/15 BY 3,686,442 8/1972 Schlichte ........................ 179/15 BY

*Primary Examiner*—Ralph D. Blakeslee

*Attorney*—Karl F. Ross

[57] ABSTRACT

To indicate the active or inactive condition of any one of a group of $n$ telegraph lines transmitting in interleaved relationship over a common channel, each line is assigned a 5-bit time slot in a recurrent cycle of $n+1$ time slots, the extra slot being utilized at the beginning of each cycle to register the 4-bit address of the first nontransmitting line in the series which is either idle (stop signal) or about to become active (start signal). In the time slot of the line so identified, a discriminating bit differentiating between "start" and "stop" conditions is accompanied by the four address bits identifying the next nontransmitting line in the series, and so forth; the extra time slot eliminates the need for a 6th bit to accommodate the start and stop signals in a 32-character telegraphy code.

10 Claims, 3 Drawing Figures

TDM TELECOMMUNICATION SYSTEM DESIGNED FOR TRANSMISSION OF SUPERVISORY SIGNALS

Our present invention relates to a time-division multiplex (TDM) telecommunication system serving for the transmission of pulse-code-modulation messages such as telegraphic (including teletype) signals.

As is well known, a code combination of $m$ bits can be used for the transmission of up to $2^m$ different characters. Thus, the standard international telecommunication code known as C.C.I.T.T. calls for 32 characters each expressed by 5 significant bits.

In a multiplex system in which such telegraphic signals are to be transmitted from $n$ incoming lines to as many associated outgoing lines by way of a common channel, with interleaving of the characters to form a composite word, there generally arises the need for sending certain supervisory signals over the line besides the characters proper, such as start and stop signals indicating incipient activation of a hitherto inactive line or cessation of transmission over such line, respectively. Since the 5-bit code cannot accommodate this additional information, a sixth bit has heretofore been added for this purpose. While this additional bit extends the number of transmissible characters to 62, besides the start and stop signals referred to, 30 of these supplementary code combinations generally remain unused.

Since, in theory, the number of bits required for the transmission of 34 code combinations is $\log_2 34 = 5.1$, the use of a 6-bit code represents a redundancy of $6 - 5.1 = 0.9$ bit.

The general object of our present invention is to provide a method of and means for substantially reducing this redundancy in a TDM system of the character described.

A more particular object is to provide a system wherein the transmission of start and stop signals, together with the pertinent address information, requires only $n+1$ time slots in a recurrent cycle accommodating $n \cdot m$ significant bits distributed over $n$ time slots of $m$ bits each, with $n$ equal to or less than $2^{m-1}-1$.

These objects are realized, pursuant to our present invention, by assigning to each incoming line an $m$-bit message slot in the aforementioned cycle of $n+1$ time slots, the extra time slot being used as a service slot to accommodate an address code of less than $m$ bits identifying any one of these lines. During transmission over the common channel, which may include a metallic circuit or a radio link, a character from each active line is entered at the multiplexing or input terminal in the assigned message slot for transmission in interleaved relationship as part of the composite word. If a supervisory signal affecting one or more inactive lines is to be sent out, the address code of the first such line is entered in the service slot; in the message slot assigned to this first inactive line, the address code of a second such line is entered, and so forth. Since these address codes occupy less than the full $m$-bit capacity of the respective time slots, there is room for at least one bit bits per time slot serving as a supervisory signal to indicate the line condition to be transmitted. This discriminating bit may therefore have a first value (e.g. "1" in binary terms) signifying a "start" condition and a second value (e.g. "0") signifying a "stop" condition. At the output or demultiplexing terminal supplied by the common channel, the service slot of the arriving composite word is read to determine the address of the first inactive line which signals one of these conditions. In conformity with the procedure at the multiplexing terminal, the message slot assigned to this first inactive line is scanned for determining the address of a second inactive line, if any, and so on.

Since the number of available time slots always exceeds by 1 the number of inactive lines, the discriminating bits relating to these inactive lines could be entered either in the time slots (including the service slot) carrying their address codes or in the time slots assigned to the lines themselves. We prefer the latter solution since it reduces the number of bits to be accommodated by the service slot.

In the specific embodiment described hereinafter, and in accordance with the principal field of application of our invention, only one discriminating bit is required for each inactive line since the only supervisory signals to be transmitted are the aforementioned start and stop signals. It should be understood, however, that the invention can also be more generally utilized for the transmission of a larger number of supervisory signals, e.g. to indicate an alarm condition; in such a case, of course, the maximum number of available lines for a code of $m$ bits (such as the conventional 5-bit code) would be correspondingly reduced.

The common transmission channel between the multiplexing or input terminal and the demultiplexing or output terminal may in turn carry interleaved words from a plurality of access units, each serving a group of incoming lines or channels, and a like plurality of distributing units, each working into a corresponding group of outgoing lines or channels, with the number of bits per word and the cadences of these bits not necessarily identical for the several access units. Such a system has been disclosed and claimed in our copending application, Ser. No. 212,514 filed 27 Dec. 1971.

The above and other features of our invention will be described in detail hereinafter with reference to the accompanying drawing in which.

Figure 1:
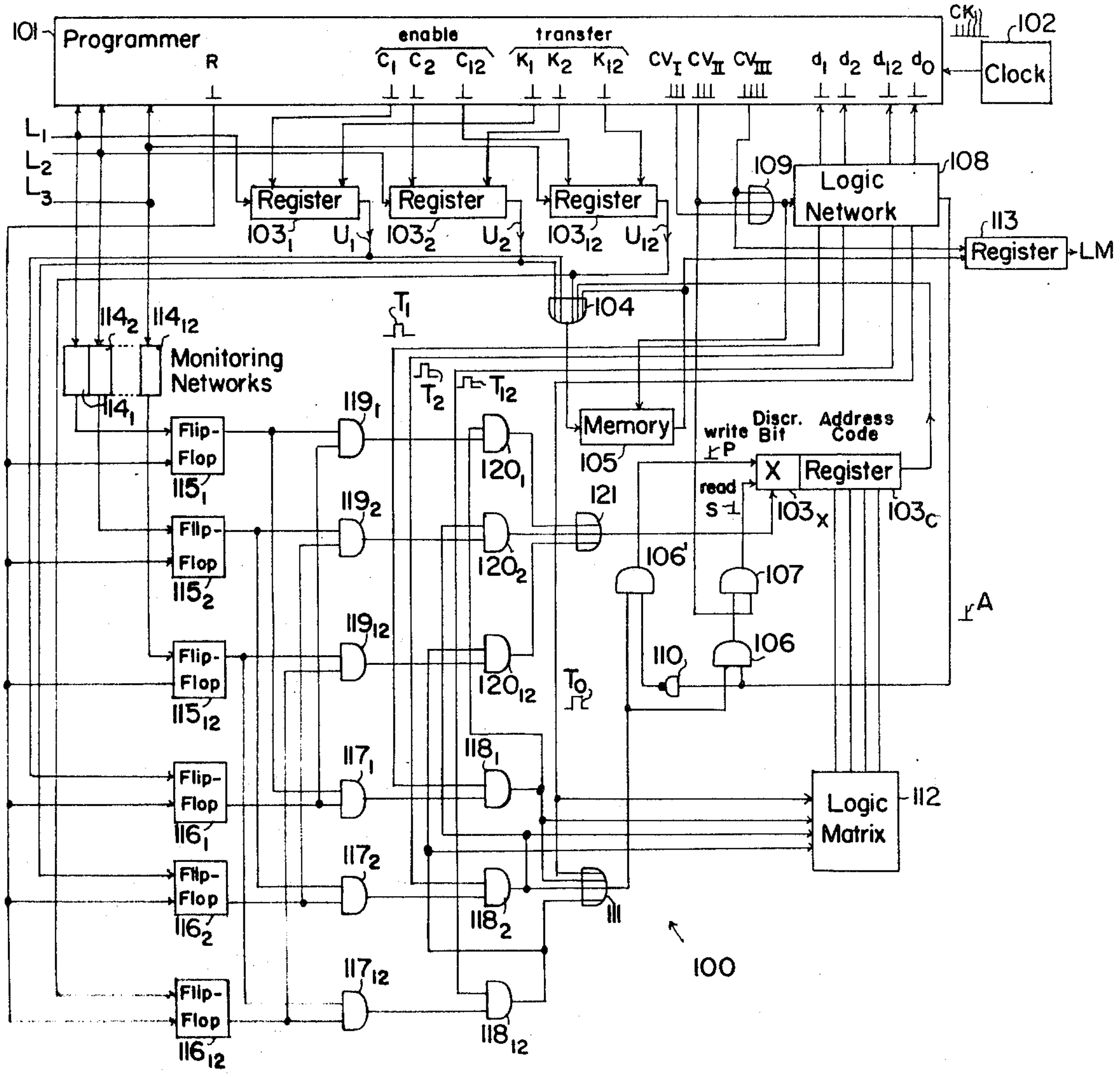
FIG. 1 is a circuit diagram of a multiplexing terminal in a system embodying the invention.

The terminal 100 shown in FIG. 1 serves as an input station for a multiplex line LM serving as a common channel for the transmission of telegraphy signals from a group of $n$ incoming lines $L_1, L_2 \ldots L_{12}$ to a like number of associated outgoing lines $L'_1, L'_2 \ldots L'_{12}$ (FIG. 3), with $n = 12$. A programmer 101, stepped by clock pulses CK from a circuit 102, generates a series of enabling pulses $C_1, C_2 \ldots C_{12}$ for a set of multiplexing registers $103_1, 103_2 \ldots 103_{12}$ each receiving the signals arriving over a respective line $L_1 - L_{12}$. Programmer 101 also generates transfer pulses $K_1, K_2 \ldots K_{12}$ for discharging these registers through an OR gate 104 into a storage unit 105 in the form of a circulating memory, e.g. as described in commonly owned U.S. Pat. No. 3,603,774. An ancillary register $103_0$, of the same 5-bit storage capacity as registers $103_1 - 103_{12}$, is divided into a 1-stage section 103$x$ for the storage of a discriminating bit X and a 4-stage section 103$a$ for the inscription of a 4-bit address code. Register $103_0$ is loaded under the control of a writing pulse P and discharged into memory 105, via OR gate 104, by a reading pulse S. The latter pulse emanates from a transfer circuit including a pair of cascaded AND gates 106, 107, gate 106 receiving switching pulses A from a logic network 108 to which read-out pulses $CV_I$, $CV_{II}$ $CV_{III}$ for memory 105 are applied from programmer 101 through an OR gate 109. Pulses $CV_I$, $CV_{II}$ and $CV_{III}$ occur in three consecutive periods or phases of an operating cycle of the programmer as more fully described hereinafter with reference to FIG. 2; pulses $CV_{II}$ periodically open the AND gate 107 during the second phase to empty the register $103_0$. Writing pulse P originates at another AND gate 106′ receiving the switching pulses A through an inverter 110; both gates 106 and 106′ have inputs energized in parallel from an OR gate 111. A logic matrix 112 supplies the address code of any inactive line to section 103*a* of register $103_0$.

The contents of memory 106 can be discharged into channel LM by way of a buffer register 113 from which the bits of a 64-bit word, composed of the interleaved code combinations stored in registers $103_0$ and $103_1$ – $103_{12}$, are read out in series under the control of pulses $CV_{III}$ in the terminal phase of the operating cycle of programmer 101. This programmer generates the enabling and transfer pulses $C_1$ etc. and $K_1$ etc., in a manner well known *per se*, under the control of a voltage sensor not shown which detects the presence of signal pulses on any of lines $L_1$ – $L_{12}$ and thereupon causes the activation of the corresponding multiplexing registers $103_1$ – $103_{12}$. A similar voltage-sensing circuit, connected across these lines upstream of the multi-plexing registers, comprises a set of 12 monitoring networks $114_1$, $114_2$ . . . $114_{12}$ which include integrating circuitry, blocking oscillators or the like with a time constant sufficient to bridge the gaps between finite bits (i.e. bits of binary value "1") in an active line transmitting a succession of characters according to the 5-bit Baudot code or an equivalent thereof whereby only a single pulse is generated in the output of any of these networks whenever the associated line starts to transmit. Monitoring networks $114_1$, $114_2$ . . . $114_{12}$ work into respective flip-flops $115_1$, $115_2$ . . . $115_{12}$ which, by their setting, indicate the incipient activation of the corresponding telegraph line and which are reset, in the third phase of each operating cycle, by a pulse R from programmer 101. The same pulse R sets a group of flip-flops $116_1$, $116_2$ . . . $116_{12}$ which are reset, in the first period or scanning phase of the next operating cycle, by output voltage $U_1$, $U_2$ . . . $U_{12}$ appearing on any active line downstream of the associated monitoring register $103_1$ – $103_{12}$; thus, only the flip-flops $116_1$ – $116_{12}$ connected to idle lines remain set throughout the operating cycle.

The flip-flops $115_1$ – $115_{12}$ (hereinafter referred to as "start" flip-flops) and $116_1$ – $116_{12}$ (hereinafter referred to as "stop" flip-flops) work into a switching matrix which includes a set of OR gates $117_1$, $117_2$ . . . $117_{12}$ each connected to the set output of a respective "start" and "stop" flip-flop, a set of AND gates $118_1$, $118_2$ . . . $118_{12}$ in cascade with these OR gates and controlled by timing pulses $T_1$, $T_2$, . . . $T_{12}$ from logic network 108, a further set of AND gates $119_1$, $119_2$, . . . $119_{12}$ having inputs connected in parallel with those of respective OR gates $117_1$ – $117_{12}$, and a third set of AND gates $120_1$, $120_2$, . . . $120_{12}$ cascaded with respective AND gates $118_1$ – $118_{12}$ and $119_1$ – $119_{12}$. AND gates $120_1$ – $120_{12}$ work through an OR gate 121 into section 103*x* of register $103_0$ whereas AND gates $118_1$ – $118_{12}$ feed the matrix 112 and, in parallel therewith, the inscription and transfer network 106, 106′, 107. OR gate 111 and matrix 112 also receive a timing pulse $T_0$ from logic network 108; this network, furthermore, delivers timing signals $d_1$, $d_2$, . . . $d_{12}$, $d_0$ to programmer 101 in order to control the generation of transfer pulses $K_1$ – $K_{12}$.

Gates $118_1$ – $118_{12}$ conduct upon the occurrence of the corresponding timing pulses $T_1$ – $T_{12}$ whenever at least one of the associated "start" and "stop" flip-flops $115_1$ – $115_{12}$ and $116_1$ – $116_{12}$ is set, thereby triggering the matrix 112 into the emission of the corresponding address code and causing the generation of an inscription pulse P to enter that address code, in parallel, in register section 103*a*. This operation takes place, however, only after a delay brought about by the shorter switching pulse A whose presence, concurrently with reading pulses $CV_{II}$, causes the emptying of register $103_0$ into memory 105 so as to make room for the new address code and discriminating bit X. This discriminating bit has the value "1" whenever the associated "start" flip-flop is set simultaneously with the corresponding "stop" flip-flop, a situation which occurs only upon resumption of transmission over a previously non-transmitting line so that the associated multiplexing register does not yet have an output $U_1$ – $U_{12}$. In this event the corresponding AND gate of the group $120_1$ – $120_{12}$ conducts concurrently with the respective AND gate of group $118_1$ – $118_{12}$ to energize the OR gate 121 so that the inscribed bit X has the value "1." If, however, the "start" flip-flop has not been set, OR gate 121 does not conduct so that the bit X has the value "0" to indicate a "stop" condition, i.e. the idleness of the line. Such a zero discriminating bit is inserted, therefore, into the time slot assigned to any idle line until that line is reactivated; upon incipient transmission, the bit changes to "1" for one cycle after which this time slot is utilized exclusively for the inscription of 5-bit characters until transmission ceases again.

The operation of the terminal 100 will now be described with reference to FIG. 2 in which graph (a) represents an operating cycle OC of programmer 101 (FIG. 1) divided into three periods $Y_I$, $Y_{II}$ and $Y_{III}$. Period $Y_I$ is the scanning phase in which the registers $103_1$ – $103_{12}$ are sampled, if the associated incoming lines $L_1$ – $L_{12}$ are active, by respective transfer pulses $K_1$ – $K_{12}$ (each consisting of a 5-pulse series) of which three, i.e. pulses $K_2$, $K_5$ and $K_{12}$, have been illustrated by way of example in graphs (*c*). The 5-bit code combinations read out by these transfer pulses are stored in respective time slots of the circulating memory 105 which completes 13 revolutions during a subcycle SC of the programmer, as indicated in graph (3); the number of such cycles during phase $Y_I$ depends on the rate at which the character bits are fed into the registers $103_1$ – $103_{12}$, this rate or cadence being the same for all lines $L_1$ – $L_{12}$. As will be apparent from graphs (b) and (c), the transfer pulses for any active register can be generated during any memory revolution provided, of course, that their timing coincides with the message slot assigned in the memory to the respective line; each time slot encompasses 5 clock cycles CK corresponding to respective memory phases. Upon entry of the last bit of a character in the register, as determined by the sensing circuits of programmer 101 in response to the state of energization of the corresponding line, the five transfer pulses are generated in rapid succession during the corresponding time slot which—though this is not apparent from graphs (b) and (c)—spans only one-thirteenth of a memory revolution as will be apparent from graphs (d) and (e) discussed below. The 13th time slot of the memory remains unoccupied during this phase.

The second phase $Y_{II}$, shown expanded in graph (d), is of the same duration as each subcycle SC of phase $T_1$ and also encompasses 13 memory revolutions. In each of these revolutions, therefore, the 13 time slots 1–12, o —shown further spread out in graph (e)—are successively available for loading from register $\mathbf{103_0}$ in the presence of transfer pulses S generated upon the coincidence of a switching pulse A with one of the timing pulses $T_0$ - $T_{12}$ from network 108 as illustrated in graphs (f). Pulses $CV_{II}$, controlling this transfer, occur at the same frequency (five per pulse A) as the transfer pulses $K_2$ etc. illustrated in graphs (c).

Figure 2:
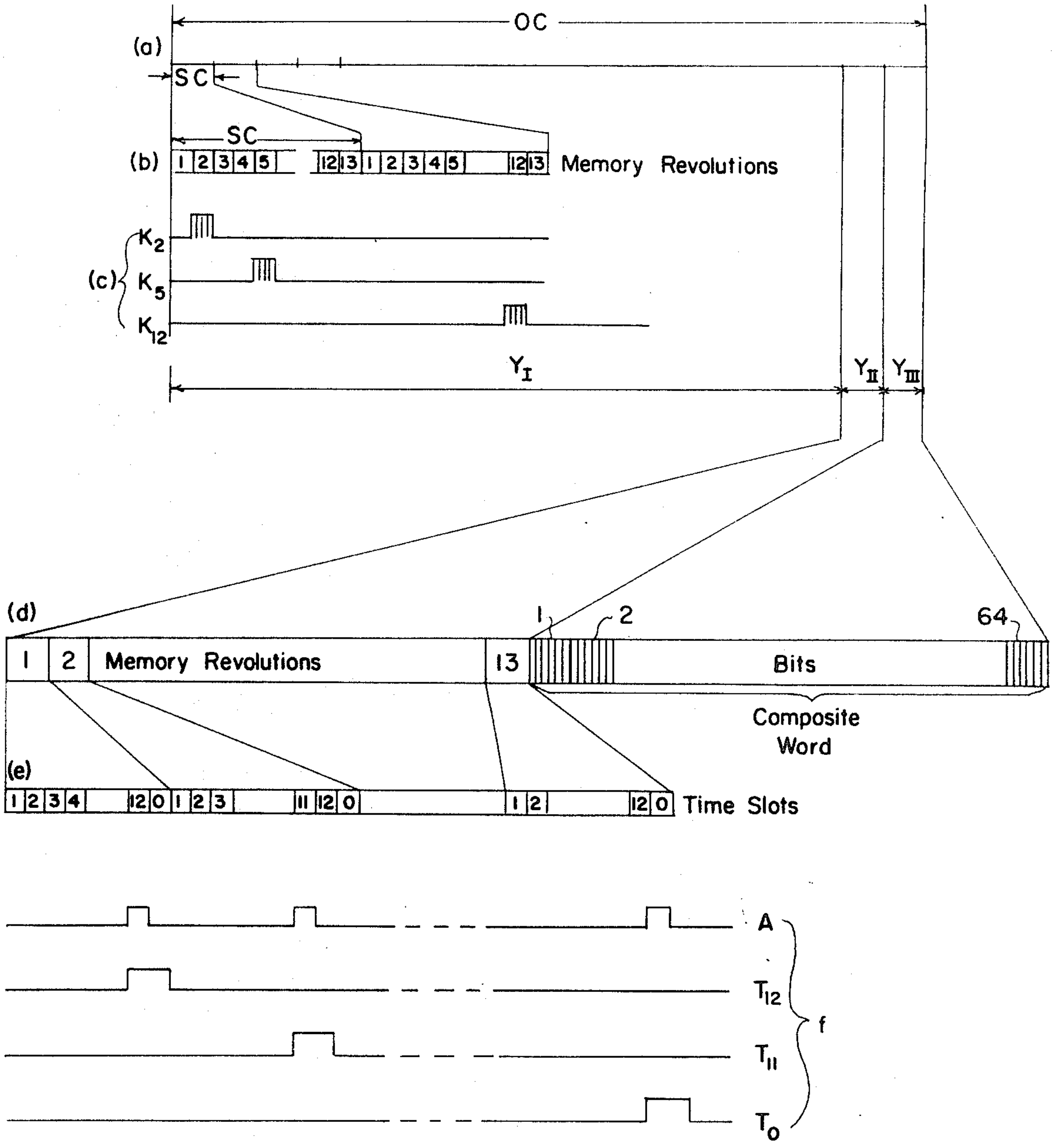
FIG. 2 is a set of graphs serving to illustrate the present method.

The sequence of timing pulses $T_0 - T_{12}$ is so chosen, as illustrated in graphs (f) of FIG. 2, that message slot No. 12 is loaded in the first revolution of phase $Y_{II}$, followed by message slot No. 11 in the second revolution, message slot No. 1 in the 12th revolution and address slot No. 0 in the 13th revolution. Thus, pulse $T_{12}$ discharges the register $\mathbf{103_0}$ at a time when section *103a* thereof is empty, only the bit X from section *103x* being transferred to memory 105 at this point if that transfer is authorized by the energization of OR gate 111. Pulse $T_{11}$, generated in the next revolution, discharges both register sections into the memory if they had been loaded with the address of line $L_{12}$ during the preceding revolution and if a transfer of this code together with an accompanying bit X is authorized at this instant by voltage from OR gate 111. In an analogous manner, the remaining time slots Nos. 10 through 0 (if unoccupied) are filled in reverse numerical order during this phase, each receiving the discriminating bit X relating to its own line and the address code of the next inactive line ranking higher in ascending numerical order. Service slot 0, of course, does not receive a discriminating bit or, more precisely, always has a reading "0" in the position of that bit. Thus, the address codes of inactive lines inscribed in register $\mathbf{103_0}$ are read out in staggered relationship with the accompanying bits X.

In phase $Y_{III}$, which lasts one revolution of memory 105, pulses $CV_{III}$ with the cadence of clock pulses CK unload the memory into buffer register 113 for which the 64 significant bits, along with synchronizing bits, are transmitted (possibly at a reduced cadence) over channel LM.

Figure 3:
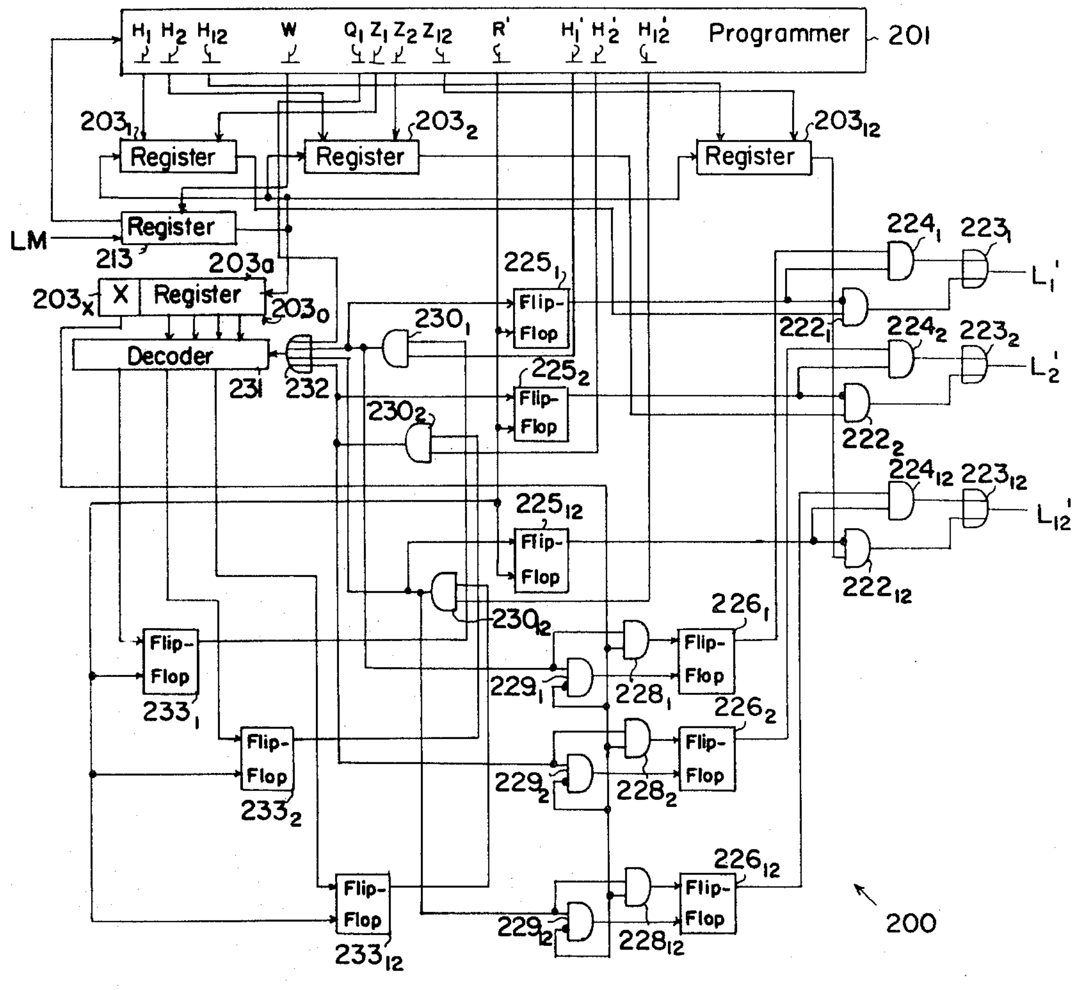
FIG. 3 is a circuit diagram of a demultiplexing terminal linked with the multiplexing terminal of FIG. 1.

FIG. 3 shows the associated output terminal 200 at the receiving end of multiplexing line LM. This line loads a buffer register 213 accommodating the 64 significant bits of each composite word together with the synchronizing bits which control a programmer 201 in a manner well known *per se*. Register 213 feeds 12 demultiplexing registers $\mathbf{203_1}$, $\mathbf{203_2}$, . . . $\mathbf{203_{12}}$ which are actuated by respective distributing pulses $H_1$, $H_2$, . . . $H_{12}$ and read by respective transfer pulses $Z_1$, $Z_2$, . . . $Z_{12}$ for distribution of their contents to lines $L'_1$, $L'_2$, . . . $L'_{12}$ connected to them via respective AND gates $\mathbf{222_1}$, $\mathbf{222_2}$, . . . $\mathbf{222_{12}}$ and OR gates $\mathbf{223_1}$, $\mathbf{223_2}$, . . . $\mathbf{223_{12}}$ in tandem therewith. AND gates $\mathbf{222_1}$, $\mathbf{222_2}$, . . . $\mathbf{222_{12}}$ have inverting inputs connected, in parallel with noninverting inputs of respective AND gates $\mathbf{224_1}$, $\mathbf{224_2}$, . . . $\mathbf{224_{12}}$, to the set outputs of respective flip-flops $\mathbf{225_1}$, $\mathbf{225_2}$, . . . $\mathbf{225_{12}}$ so as to transmit the contents of the corresponding demultiplexing registers to the associated outgoing lines if these flip-flops are reset. Gates $\mathbf{224_1}$–$\mathbf{224_{12}}$, also cascaded with OR gates $\mathbf{223_1}$–$\mathbf{223_{12}}$, have other inputs connected to the set outputs of respective flip-flops $\mathbf{226_1}$,$\mathbf{226_2}$, . . . $\mathbf{226_{12}}$ whose state of operation is controlled by the discriminating bit X in a section *203x* of a register $\mathbf{203_0}$ also connected to the output of buffer register 213. This bit X is applied to a lead 227 terminating at noninverting inputs of a set of AND gates $\mathbf{228_1}$, $\mathbf{228_2}$, . . . $\mathbf{228_{12}}$ and at inverting inputs of another set of AND gates $\mathbf{229_1}$, $\mathbf{229_2}$, . . . $\mathbf{229_{12}}$, the remaining inputs of these two sets of AND gates being energizable from the outputs of respective AND gates $\mathbf{230_1}$, $\mathbf{230_2}$, . . . $\mathbf{230_{12}}$ also working into an enabling input of a decoder 231 through an OR gate 232. Decoder 231 receives the address code stored in a 4-stage section *203a* of register $\mathbf{203_0}$ whenever a 5-bit portion of an arriving composite word relates to an inactive line $L_1 - L_{12}$. Register $\mathbf{203_0}$ also temporarily stores the character bits from active lines which, however, is immaterial for the operation of the system.

Decoder 231, upon establishing the identity of any inactive line $L_1 - L_{12}$, feeds a corresponding signal pulse to a respective flip-flop $\mathbf{233_1}$, $\mathbf{233_2}$, . . . $\mathbf{233_{12}}$ so as to set same. This flip-flop then opens the associated AND gate $\mathbf{230_1}$, $\mathbf{230_2}$, . . . $\mathbf{230_{12}}$ for the passage of a trigger pulse $H'_1$, $H'_2$, . . . $H'_{12}$ in a series of such pulses sequentially emitted by programmer 201 (together with pulses $H_1 - H_{12}$) in the course of an operating cycle, thereby energizing the enabling input of decoder 231 through OR gate 232. The conduction of any AND gate $\mathbf{230_1}$–$\mathbf{230_{12}}$ also sets the respective flip-flop $\mathbf{225_1}$–$\mathbf{225_{12}}$ which controls the associated pair of switching gates $\mathbf{222_1}$–$\mathbf{222_{12}}$ and $\mathbf{224_1}$–$\mathbf{224_{12}}$ alternately feeding the lines $L'_1 - L'_{12}$ by way of OR gates $\mathbf{223_1}$–$\mathbf{223_{12}}$. Flip-flops $\mathbf{225_1}$–$\mathbf{225_{12}}$ are periodically reset by a pulse R' at the end of each operating cycle.

Entrance register 213 is read in response to stepping pulses W at a rate spreading the 64 bits thereof more evenly over an operating cycle. The individual line registers $\mathbf{203_1}$–$\mathbf{203_{12}}$, receiving respective code combinations under the control of distributing pulses $H_1 - H_{12}$, are discharged by pulses $Z_1$, $Z_2$, . . . $Z_{12}$ at the rate of retransmission of the message bits over the outgoing line $L'_1 - L'_{12}$.

In the sequence established by the aforedescribed operation of terminal 100, the 4-bit service slot follows the No. 12 message slot of a composite word and therefore immediately precedes the No. 1 message slot of the succeeding word. From the synchronizing code, which may either precede or follow the service slot, the programmer 201 establishes the occurrence of this extra time slot and sends a starting pulse Q through OR gate 232 into decoder 231 which therefore, if the service slot carries an address code, sets whichever of flip-flops $\mathbf{233_1} - \mathbf{233_{12}}$ is marked by that code. The set flip-flop then primes the corresponding AND gate $\mathbf{230_1}$ – $\mathbf{230_{12}}$ for the arrival of the one pulse in the series of trigger pulses $H'_1 - H'_{12}$ which corresponds to the line identified by that address and which occurs concurrently with the distributing pulses $H_1 - H_{12}$ loading the corresponding demultiplexing registers $\mathbf{203_1}$ – $\mathbf{203_{12}}$. The code combination entering that register, consisting of the discriminating bit X for that line and the address code of a higher-ranking line (if any) which is inactive during this operating cycle, is simultaneously stored in register $230_0$ so that another flip-flop in the group $233_1$ – $233_{12}$ identified by such address is now set. The conduction of any AND gate $230_1$ – $230_{12}$ also sets the associated flip-flop $225_1$ – $225_{12}$ with resulting blocking of character transmission to the respective line $L'_1$ – $L'_{12}$ via AND gate $222_1$ – $222_{12}$. Depending on the value of bit X stored at that instance in register section 203$x$, the corresponding flip-flop $226_1$ – $226_{12}$ is or is not set so that a voltage signal of finite magnitude is or is not sent out over the affected line $L'_1$ – $L'_{12}$. The same procedure is repeated throughout the cycle as many times as there are inactive lines characterized by either a "start" of a "stop" condition.

In this manner, the discriminating information conveyed over the channel LM in the form of a single bit per inactive line is reconstituted at the output terminal 200 and converted into one of two distinct states of energization of the outgoing line to which it pertains. Naturally, this information could also be translated into a bipolar signal, for example, in lieu of a simple on/off voltage.

We claim:

1. A time-division-multiplex system for the transmission of $2^m$ different characters of $m$ bits each along with at least two supervisory signals from $n$ incoming lines to $n$ associated outgoing lines over a common channel extending between an input terminal and an output terminal, with n at most equal to $2^{m-1}-1$, comprising:

storage means at said input terminal having a capacity of n+1 time slots of m bits each, including n message slots respectively assigned to said incoming lines and a service slot;

read-out means connected to said storage means for periodically delivering the contents of said time slots in cyclic succession to said common channel for transmission to said output terminal;

a set of n multiplexing registers each connected at said input terminal to one of said incoming lines for receiving therefrom a succession of characters to be transmitted over said common channel as part of a composite word;

an ancillary register at said input terminal with a storage capacity of m bits including at least one discriminating bit differentiating between a plurality of line conditions and a multibit address code identifying any one of said incoming lines;

first transfer means at said input terminal for periodically scanning said multiplexing registers to enter the characters stored therein, one character at a time, in the respectively assigned time slot of said storage means during a recurring operating cycle;

second transfer means at said input terminal operable to enter the contents of said ancillary register in a time slot of said storage means not occupied by a character for inclusion in said composite word;

a set of n monitoring circuits at said input terminal respectively connected to said lines for ascertaining the existence of any of said line conditions on an inactive line not engaged in character transmission;

inscription means at said input terminal for inserting into said ancillary register a discriminating bit indicating a line condition detected by any one of said monitoring circuits together with the address code of the inactive line affected by said condition;

switch means at said input terminal for successively connecting said monitoring circuits to said inscription means in a predetermined sequence during each operating cycle to load said ancillary register in the presence of a detected line condition on an inactive line;

programming means at said input terminal controlling the operation of said first and second transfer means, said inscription means, said read-out means and said switch means, said second transfer means being controlled by said programming means to enter the address code of a first inactive line in said service slot, the address code of a second inactive line in the message slot of the same composite word assigned to said first inactive line, and so forth, with simultaneous entry of respective discriminating bits in all but one of the time slots receiving said address codes;

a set of n demultiplexing registers for said characters respectively connectable to said outgoing lines at said output terminal;

distributing means at said output terminal for selectively directing respective characters from said common channel to said demultiplexing registers for retransmission over said outgoing lines;

a further register at said output terminal connected to said common channel for the temporary storage of any $m$-bit combination arriving thereover;

decoding means connected to said further register for deriving respective identify signal from address codes stored therein;

a set of $n$ line-identification units respectively actuatable by said identity signals;

synchronziing means at said output terminal responsive to said composite word for enabling said decoding means to actuate a first line-identification unit under the control of an address code in said service slot, to actuate a second line-identification unit under the control of an address code in the message slot assigned to the line identified by said first unit, and so forth;

signal-generating means at said output terminal connected to said further register for operation in accordance with a stored discriminating bit under the control of an actuated line-identification unit; and selector means at said output terminal controlled by said line-identification units for temporarily switching any outgoing line identified thereby from the associated demultiplexing register to said signal-generating means.

2. A system as defined in claim 1 wherein said inscription means includes a timing circuit for establishing said predetermined sequence in the reverse order of the delivery of the contents of said time slots to said common channel by said transfer means.

3. A system as defined in claim 2 wherein said timing circuit includes blocking means for delaying the insertion of an address code into said ancillary register until after the entry of an accompanying discriminating bit together with a previously inserted address code in a time slot of said storage means whereby each address code in a message slot is paired with a discriminating bit relating to the condition of the line identified by an address code in a preceding time slot.

4. A system as defined in claim 1 wherein said storage means comprises a circulating memory.

5. A system as defined in claim 1 wherein said discriminating bit has a first value signifying an idle line condition and a second value signifying incipient transmission over a line, said monitoring circuits comprising first voltage-detecting means connected across each incoming line upstream of the corresponding multiplexing register for the generation of a start signal in response to incipient line energization and second voltage-detecting means connected across each incoming line downstream of the corresponding multiplexing register for the generation of a stop signal upon the cessation of character transmission.

6. A system as defined in claim 5 wherein said programming means divides said operating cycle into a first period for the operation of said first transfer means, a second period for the operation of said switch means, said inscription means and said second transfer means, and a third period for the operation of said read-out means, said second voltage-detecting means comprising a set of $n$ flip-flops connected to be set by said programming means in said third period and to be reset by voltage on the associated line in said first period.

7. A method of multiplexing binary messages from n incoming lines for transmission over a common channel to $n$ associated outgoing line, said message consisting of $m$-bit characters selected from $2^m$ different code combinations, together with at least two supervisory signals relating to different line conditions, $m$ being at most equal to $2^{m-1}-1$, comprising the steps of:

- assigning to each incoming line a message slot of $m$ bits in a recurrent cycle of $n+1$ time slots, the extra time slot being used as a service slot accommodating an address code of less than m bits identifying any one of said incoming lines;
- entering a character from each active line in the assigned message slot for transmission in interleaved relationship over said common channel as part of a composite word;
- entering in said service slot, for transmission as part of said composite word, the address code of a first inactive line not engaged in character transmission;
- entering the address code of a second inactive line in the message slot of the same composite word assigned to said first inactive line, and so forth;
- entering at least one discriminating bit, signifying the condition of an inactive line, in each but one of the time slots receiving said acdress codes;
- detecting, at the remote end of said common channel, an address code appearing in the service slot of a received composite word and determining therefrom the identity of said first inactive line;
- detecting, at said remote end, an address code appearing in the message slot of the same composite word assigned to said first inactive line and determining therefrom the identity of said second inactive line, and so forth;
- extracting from said composite word, at said remote end, the discriminating bits relating to said inactive lines; and
- retransmitting line-condition signals derived from the extracted discriminating bits over respective outgoing lines associated with the lines identified from said address codes.

8. A method as defined in claim 7 wherein said discriminating bits are entered only in message slots, said service slot containing only an address code.

9. A method as defined in claim 7 wherein said discriminating bit has a first value signifying an idle line condition and a second value signifying incipient transmission over a line.

10. A method as defined in claim 9 wherein each character consists of 5 bits, each address code consisting of 4 bits.

* * * * *